# UNITED STATES PATENT OFFICE.

LOUIS L. BENTLEY, OF BEAVER FALLS, PENNSYLVANIA, ASSIGNOR TO ARMSTRONG CORK COMPANY, OF PITTSBURGH, PENNSYLVANIA, A CORPORATION OF PENNSYLVANIA.

METHOD OF MAKING CORK ARTICLES.

1,184,306.     Specification of Letters Patent.     Patented May 23, 1916.

No Drawing.     Application filed November 25, 1914. Serial No. 873,962.

*To all whom it may concern:*

Be it known that I, LOUIS L. BENTLEY, a citizen of the United States, and a resident of Beaver Falls, in the county of Beaver and State of Pennsylvania, have invented a new and useful Method of Making Cork Articles, of which the following is a full, clear, and exact description.

My invention has relation to a method of making shaped cork articles which will give such articles a greater strength than has heretofore been possible; and by which the cork particles of which the articles are composed are expanded to a greatly increased volume with a large reduction in specific gravity.

In a co-pending application, Serial No. 873,964, filed November 25, 1914, I have described and claimed a method of treating granulated cork in which the cork particles are heated to a temperature sufficient to convert the contained moisture into steam or vapor, which is driven off by the action of the heat, thus causing a large expansion of the cork particles, which may amount to one hundred per cent. or more.

In accordance with my present invention the cork particles which have been preheated in this manner are placed in molds, and are subjected to pressure in the molds. The molds are then subjected to a baking action at a higher temperature than that used in the preheating operation. The effect of baking at a higher temperature while the cork is under pressure, is to cause a further expansion of the individual granules. This results in a closing up of the voids between the granules, and a better cementing together of the entire mass whereby a stronger and more durable article is produced.

In accordance with my invention the cork particles are preheated by any suitable means to a temperature which is preferably of from 400 to 550 degrees Fahrenheit. For this purpose I may employ a heating chamber of any suitable character, such as a shell to which the heat is applied externally, or the cork particles may be placed in suitable receptacles and submerged in a bath of molten metal, such as lead. The effect of this preheating, which is carried to a point above that at which the contained resinous matter in the cork will commence to melt, the moisture as well as other volatile matter within the cork is converted into steam or vapor. By rapidly bringing up the cork to this comparatively high temperature, the conversion of the volatile matter into steam or vapor is effected more or less suddenly, causing a large increase in the volume of the cork, due to the expansion of its cells. The increase in volume may be from thirty-five to more than one hundred per cent., with, of course, a corresponding decrease in the specific gravity of the material. The cork particles so treated, preferably while still at as high a temperature as practicable, are fed into molds and are subjected to pressure therein. The molds with their contained material are then subjected to a baking action, with the material confined therein under pressure. The baking preferably takes place at a temperature in excess of 600 degrees Fahrenheit, and the pressure is retained until the material has thoroughly set in the molds after the baking operation is completed. This second heating at a considerably higher temperature than the preheating temperature causes a further expansion of the individual granules, resulting in increased internal pressure in the confined mass, the action of which is to close up the voids between the granules and greatly increase the strength and durability of the finished product. Owing to the relatively high preheating temperature employed, which causes the more inflammable material contained in the cork to be driven off, I am enabled to very materially increase the temperature employed during the baking operation without injury to the cork by burning or charring. It will be seen that in general the method is similar to that described in my prior Patent No. 1,035,146, of August 13, 1912; but that it is differentiated therefrom by the higher preheating temperature employed, as well as by the higher baking temperature. In the method of said patent the pressure given the material in the molds was relied upon to effect a proper cementing of the cork granules. In the present method this pressure is increased as above described by the action of the higher baking temperature.

I claim:

1. The method of making cork articles, which consists in subjecting granulated cork to a temperature sufficient to expel the more inflammable volatile matter contained therein, and at the same time effecting a partial expansion of the cork particles, then feeding the cork particles into a mold and subjecting them to a baking action while confined in the mold at a temperature materially in excess of that used in the first heating, substantially as described.

2. The method of making cork articles, which consists in preheating granulated cork to a temperature in excess of 400 degrees Fahrenheit, thereby vaporizing and driving off the more inflammable volatile matter contained therein, feeding the treated cork into molds, and applying pressure to the material in the molds to effect the cementing of the cork granules, and baking the material while in the molds, substantially as described.

3. The herein described method of making cork articles, which consists in preheating granulated cork to a temperature in excess of 400 degrees Fahrenheit, or higher, thereby causing the cork to expand in volume more than thirty-five per cent. with a corresponding decrease in its specific gravity, and the driving off of inflammable material contained therein, and feeding the treated cork into molds and subjecting it to pressure therein, whereby the cork granules are cemented together, and baking the material while it is confined in the molds, substantially as described.

4. The herein described method of making cork articles, which consists in preheating granulated cork to a temperature in excess of 400 degrees Fahrenheit, thereby driving off inflammable gases contained therein, and causing the cork to largely expand in volume, feeding this treated cork into molds, and baking the cork while under pressure at a temperature largely in excess of the preheating temperature, and retaining the material under pressure in the molds until the mass has cooled and set, substantially as described.

5. The herein described method of making cork articles, which consists in preheating granulated cork to a temperature in excess of 400 degrees Fahrenheit, thereby driving off inflammable gases contained therein, and causing the cork to largely expand in volume, feeding this treated cork into molds, and baking the cork while under pressure at a temperature in excess of 600 degrees Fahrenheit, and retaining the material under pressure in the molds until the mass has cooled and set, substantially as described.

6. The herein described method of making cork articles, which consists in preheating granulated cork to a temperature of from 400 degrees Fahrenheit to 550 degrees Fahrenheit, thereby driving off volatile inflammable matter contained therein, and causing the cork to expand in volume more than thirty-five per cent., feeding this treated cork into molds, and baking the cork while under pressure in the molds at a temperature of at least 600 degrees Fahrenheit, thereby causing a further expansion of the individual granules and the closing up of the voids between the granules, and retaining the pressure on the material until the mass has set, substantially as described.

7. The herein described method of making cork articles or board, which consists in preheating loose cork particles to a temperature at which the more inflammable matter contained therein will be driven off, then shaping the material to the desired form and baking it while confined substantially to such shape at a temperature largely in excess of the preheating temperature, substantially as described.

8. The herein described method of making cork articles or board, which consists in preheating loose cork particles to a temperature at which the more inflammable matter contained therein will be driven off, then shaping the material to the desired form and baking it while confined substantially to such shape at a temperature in excess of 600 degrees Fahrenheit, substantially as described.

9. In the manufacture of cork articles, the step which consists in baking the shaped material while confined substantially to shape at a temperature in excess of 600 degrees Fahrenheit, substantially as described.

In testimony whereof, I have hereunto set my hand.

LOUIS L. BENTLEY.

Witnesses:
MARTIN L. MOONEY,
EARL R. LEYDA.